United States Patent Office 2,801,223
Patented July 30, 1957

2,801,223

NOVEL ANION EXCHANGE RESINS FROM VINYL, ALKYL, RING-CONTAINING-NITROGEN-CARBON-HETEROCYCLIC POLYMERS AND PROCESS FOR PRODUCING THE SAME

Albert H. Greer, Westmont, N. J., assignor to The Permutit Company, New York, N. Y., a corporation of Delaware No Drawing. Application August 12, 1952,
Serial No. 304,009

15 Claims. (Cl. 260—2.1)

The present invention relates to novel, synthetic polymeric compositions which are useful in the removal of anions from aqueous solutions. The invention relates also to a method of removing anions from an aqueous solution and to the method of preparing these synthetic polymeric compositions. More particularly, the polymeric compositions, according to the present invention, are di- and poly-quaternary ammonium derivatives of copolymers of a vinyl derivative of a nitrogen-containing heterocyclic compound and an unsaturated crosslinking compound. Desirably, the nitrogen-containing heterocyclic compound is a substituted, vinyl pyridine compound and particularly an alkyl substituted vinyl pyridine.

Anion exchange resins, in order to be satisfactory for use, must be substantially insoluble in water, dilute acids and alkalies. They must be capable of resisting physical transformation, such as undue swelling, or mechanical disintegration, such as spalling or shattering of the resin beads and granules, when in contact with the solution they are used to deionize. They must also have a high useful or operating capacity for removing anions from aqueous solutions, and be capable of being repeatedly regenerated for reuse when they become exhausted. It is also desirable that in addition to a high operating capacity, the resin have a high capacity for removing the weaker anions from solution, such as silica and carbon dioxide.

It is an object of the present invention to provide a novel anion exchange resin which, while possessing all of the essential properties of a successful anion exchange resin, possesses an unusually high operating capacity and particularly a high capacity for the removal of weaker anions from aqueous solutions.

It is a further object to provide a novel process for the removal of anions, and especially weaker anions, from aqueous solutions.

It is an additional object to provide a novel process for producing the novel anion exchange resins of the present invention.

Other objects will be apparent to those skilled in the art from a reading of the description which follows.

My invention comprises anion exchange resins in the nature of quaternary ammonium derivatives of a copolymer of a vinyl-alkyl substituted, nitrogen-containing heterocyclic compound and an unsaturated crosslinking compound. The resins of the invention preferably have two or more quaternary ammonium groups for each molecular unit of heterocyclic compound. The quaternary ammonium groups may be substituted with alkyl, aralkyl or alkanol groups. It is also desirable that, in any event, the alkyl, aralkyl and alkanol groups be of the "lower" category, i. e., having 8 or less carbon atoms and in the case of alkyl and alkanol groups, preferably not more than 4 carbon atoms.

The quaternary ammonium derivatives of nitrogen-containing heterocyclic moiety of the copolymers of the invention will be described in more detail by the structural formula which follows and is based upon a 2-alkyl-5-vinyl-pyridine for purposes of illustration:

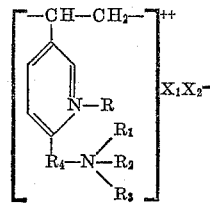

In the above formula, R, $R_1$, $R_2$ and $R_3$ are members selected from the class consisting of alkyl, alkanol and aralkyl groups. $R_4$ is a lower alkylene group, and preferably a methylene group. As has been stated above, R, $R_1$, $R_2$ and $R_3$ are desirably "lower" in size, containing not more than 8 carbon atoms and preferably up to 4 carbon atoms. $X_1$ and $X_2$ are anions and need not be identical. It is to be understood that the heterocyclic ring may contain further nitrogen atoms and also may be substituted with further alkyl substituents which will each become substituted with a further quaternary ammonium group. Those copolymers in which the quaternary ammonium group contains at least one lower alkanol group are superior in their ability to remove the weaker anions from an aqueous solution. It is most desirable that the alkylene group $R_4$ be a methylene group. Similarly, in those cases where R, $R_1$, $R_2$ and $R_3$ are alkyl groups, best results are obtained where the alkyl groups are methyl groups. The most suitable alkanol group is the ethanol group.

It is desirable that $X_1$ and $X_2$ be anions of a strong acid, such as the mineral acids. For anion exchange purposes, it is recommended that both X's be hydroxide groups.

It will be evident from the structure of the pyridine moiety of the copolymer that there are at least two quaternary ammonium groups per heterocyclic unit; one of which is formed in part by the nitrogen contained in the ring and another is attached to the ring through a lower alkylene group. If the heterocyclic ring contains a second nitrogen atom, this may additionally form another quaternary ammonium group when treated with a quaternizing agent. Also, if the original heterocyclic ring is substituted with more than one alkyl group, it is possible to halogenate these additional alkyl groups also by the process to be described and to subsequently provide further quaternary ammonium groups.

Among the vinyl derivatives of nitrogen-containing heterocyclic compounds which may become part of the heterocyclic ring moiety of the molecule after being halogenated, aminated and then quaternized in accordance with the process of the invention are the vinyl-alkyl-pyridines, such as 2-methyl-5-vinylpyridine, 2-ethyl-5-vinylpyridine, 3-methyl-5-vinylpyridine, 2,3-dimethyl-5-vinylpyridine, 2-methyl-3-ethyl-5-vinylpyridine, and vinylpyridine substituted in the ring with other alkyl groups, such as propyl, isopropyl, butyl, isobutyl and octyl, etc. The nature of the substituents, other than the vinyl group, substituted on the pyridine ring may be varied in accordance with physical properties of the resulting resin, the number of quaternary ammonium groups and the commercial availability of the vinyl-alkyl substituted, nitrogen-containing pyridine compounds. The preferred compound is 2-methyl-5-vinylpyridine.

The other component of the copolymer is an unsaturated crosslinking compound. This is a well defined type of compound having the faculty of polymerizing with vinyl substituted compounds to form an insoluble resin. They may be polyvinyl aromatic or aliphatic unsaturated compounds. The most important type of crosslinkers are the polyvinylaryl compounds; such as the divinyl and other polyvinyl benzenes, including trivinyl and tetravinyl benzenes, divinyl toluenes and alkylbenzenes, xylenes, naphthalenes and diphenyls. Other crosslinking compounds which may be used advantageously are unsaturated aliphatic compounds containing two unsaturated groups, desirably two double bonds. Examples of these are: divinyl sulfone; divinyl ketone; vinyl esters of acrylic, methacrylic and ethacrylic acids, such as vinyl acrylate, vinyl methacrylate and vinyl ethacrylate; divinyl esters of dibasic acids, such as divinyl oxylate, divinyl maleate, divinyl malonate and divinyl succinate; and acrylic diesters of an aliphatic polyhydric alcohol, such as diethylene glycol dimethacrylate, ethylene glycol dimethacrylate, diethylene glycol diacrylate, glycerine dimethacrylate and ethylene glycol diacrylate. Other unsaturated aliphatic groups than the vinyl group may be used, although the group should preferably have a terminal double bond. Among such groups which may be used to replace the vinyl group are the allyl group, the 3-n-butenyl group, etc. To date, divinylbenzene has proven the most suitable for use in the copolymer of the invention.

As has been stated above, the preferred polymerizate is that prepared by copolymerizing a vinyl-alkyl-pyridine, and suitably 2-methyl-5-vinyl-pyridine, and divinyl benzene; the latter serving as the crosslinker. It is preferred that the vinyl-alkyl-pyridine constitute from 60.0 to 99.9%, on a molar basis, of the polymerizate and that the crosslinker constitute 0.1 to 40.0% of the polymerized mixture, on a molar basis. Best results are obtained when the alkyl-vinyl-pyridine constitutes 85.0 to 99.5% of the polymerizate and the crosslinker from 5.0 to 15.0% (both on a weight basis). The optimum composition of the polymerizate is one prepared from 10% by weight of crosslinker and 90% by weight of the alkyl-vinyl-pyridine.

A polymerizate having a particle size range of between 16 to 50 mesh is most desired.

The present invention also comprises the novel process for preparing the novel anion exchange resins. In preparing my anion exchange resins, I first prepare the copolymer. The resulting copolymer is then subjected to halogenation, amination with a tertiary amine and alkylation with a quaternizing agent. Subsequent to the polymerization step, the other three steps may be conducted seriatim, but in any order, providing the amination step is conducted subsequent to the halogenation step. The preferred process of the invention is to (1) polymerize the vinyl-alkyl-pyridine with the crosslinker to produce the copolymer, (2) halogenate the copolymer, (3) aminate the halogen derivative with a tertiary amine, and finally (4) quaternize the resulting tertiary-quaternary amine. In the discussion which follows, the process of the invention will be described in terms of the preferred sequence of steps, although it must be appreciated that this sequence may be varied so long as the halogenation step shall always precede the amination step.

The copolymer is prepared by reacting the vinyl-alkyl-pyridine with the crosslinking compound in the presence of an oxidizing catalyst, such as oxygen, organic peroxides, such as benzoyl peroxide, lauroyl peroxide, tertiary alkyl peroxides, di (tertiary alkyl) peroxides, and persalts, such as potassium persulfate, etc. The catalyst may be used in varying amounts and desirably from 0.01 to about 5 parts per 100 parts of total monomer. The polymerization may be conducted in an aqueous emulsion or in an inert organic solvent.

It is also possible to quaternize the tertiary amine group of the heterocyclic ring in accordance with the general method to be described, prior to the polymerization step. In this modification of my process, it is then necessary only to halogenate the alkyl side chain, aminate and finally quaternize the resulting tertiary amino alkyl group.

The halogenation step is conducted by treating the copolymer with chlorine or bromine. By halogenation is meant only chlorination or bromination. The reaction is conducted in an inert, non-aqueous solvent, such as carbon tetrachloride or glacial acetic acid. The halogenation is desirably conducted under exposure to ultra-violet radiation.

The amination of the halogenated copolymer is accomplished by reacting it with a tertiary amine or tertiary alkanol amine which has the formula $(R_1, R_2, R_3)N$, the R's having the same definition as described above. The amination is conducted in an aqueous or non-aqueous solvent. Suitable aminating agents are trimethylamine and dimethylethanolamine. Other suitable amines are those having alkyl, aryl, cycloalkyl and aralkyl groups. Examples are triethyl and tripropyl amines, dimethylethylamine, diethylcyclohexylamine; diphenylethylamine, benzyldimethylamine, diethylethanolamine, etc.

It is possible to use a secondary amine to aminate the halogenated copolymer and thus produce a tertiary amino alkyl derivative. Quaternization of both the tertiary nitrogen atom of the pyridine ring and of the alkyl side chain is then performed by treating the copolymer with a quaternizing agent which is normally also an alkylating agent. The quaternizing of the ditertiary amino derivative or the tertiary amino-quaternary amino alkyl derivative is usually conducted in either a non-aqueous solvent, such as methanol, or an aqueous solvent. Suitable quaternizing agents are the alkyl halides, such as methyl chloride, bromide and iodide, ethyl chloride, bromide and iodide, etc.; dialkyl sulfates, such as dimethyl, diethyl, dipropyl, dibutyl sulfates; epihalohydrins, such as epichlorohydrin; and alkyl esters of aryl sulfonates, such as methyl toluene sulfonate and methyl benzene sulfonate.

The invention also comprises the novel process for removing anions from an aqueous solution, comprising contacting the solution with the quaternary ammonium derivative of the copolymerizates of the invention. The quaternary ammonium derivatives of the copolymerizates are present in sufficient quantity to remove substantially all the anions from the aqueous solution. This may be done by passing the solution through a column packed with the anion exchange resin. The anion may be removed satisfactorily from the resin and the resin thus regenerated by washing it with a dilute alkali, preferably a sodium hydroxide, which alkali will form a soluble salt with the adsorbed anions.

In order more clearly to disclose the nature of the present invention, specific examples illustrating the preparation of typical compounds will hereinafter be described. It should be understood, however, that this is done solely by way of example and is intended neither to delineate the scope of the invention nor limit the ambit of the appended claims.

*Example 1*

A copolymer was prepared which consisted of 5% crosslinker in the following manner: To about 600 ml. of water heated to 60° C. was added a mixture of 181.7 gms. of 2-methyl-5-vinyl pyridine, 18.3 gms. of 54.8% strength divinyl benzene-46.2% strength ethyl vinyl benzene, and 1.2 gms. of benzoyl peroxide. After heating for 5 hours at 80° C., with stirring, the polymerization was complete. The resulting product was washed with water and dried at 130° C. for 3 hours. The yield was nearly quantitative.

About 51.2 gms. of the resulting copolymer was suspended in a mixture of 40 ml. of acetic anhydride, 120 gms. of sodium acetate and 500 ml. of glacial acetic acid. The mixture was heated to 80° C., with stirring, and 30.5 gms. of chlorine gas was passed into the mixture over a period of 3 hours. During chlorination, the reaction mixture was irradiated with ultra-violet light. The chlorinated copolymer was removed by filtration and washed with water. After being washed with dilute sodium hydroxide, rewashed with water and dried, the product was found to contain about 10.0% chlorine.

About 40 gms. of the resulting chlorinated copolymer was suspended in 75 ml. of water and 75 gms. of a 70% aqueous solution of dimethylethanolamine was added. The suspension was heated at 70° C. for 6 hours. After being washed and dried in the air, the resulting tertiary alkanolamine derivative was found to have a basicity value of 7.1 kgr./cu. ft., an ultimate capacity of 26.2 kgr./cu. ft. and a density of 233 gms./liter.

About 47 gms. of the above aminated copolymer was covered with methanol to form a slurry and 50 gms. of methyl iodide was added. The mixture was heated at 35° C. for 6 hours during which time the mixture was stirred. The resulting alkanol quaternary ammonium derivative was washed with methanol and air dried. The basicity was found to be 17.1 kgr./cu. ft., the ultimate capacity 24.4 kgr./cu. ft. and the density 250 gms./liter.

*Example 2*

About 40 gms. of the chlorinated copolymer prepared in Example 1 was suspended in 30 ml. of water and 125 gms. of a 25% solution of trimethylamine was added. The mixture was stirred and heated at 50° C. for 10 hours. The resulting tertiary amine derivative, after being washed with methanol and air dried, had a basicity value of 7.8 kgr./cu. ft., an ultimate capacity of 31.3 kgr./cu. ft. and a density of 150 gms./liter.

About 50 gms. of the tertiary amine derivative prepared above was then covered with methanol to form a slurry, 60 gms. of methyl iodide was added and the mixture heated, with stirring, at 35° C. for 6 hours. After being washed and dried, the resulting quaternary ammonium derivative of the copolymer had a basicity value of 14.8 kgr./cu. ft., an ultimate capacity of 22.8 kgr./cu. ft. and a density of 224 gms./liter.

*Example 3*

A copolymer was prepared containing approximately 5% of crosslinker by adding to 900 ml. of water heated to 55° C., a mixture of 272 gms. of 2-methyl-5-vinyl pyridine, 27.4 gms. of 54.8% strength divinyl benzene-46.2% strength ethyl vinyl benzene, and 1.8 gms. of benzoyl peroxide. The mixture was heated, with stirring, at 80° C. for 4 hours when polymerization was completed.

About 100 gms. of the above copolymer was suspended in 300 gms. of carbon tetrachloride and 3 gms. of phosphorous trichloride was added and 50 gms. of chlorine gas was passed through the suspension at 70° C. while the suspension was exposed to ultra-violet light. The material was filtered and washed with dilute sodium hydroxide. After washing and drying, the resulting beads were found to contain 16% chlorine.

About 80 gms. of the chlorinated copolymer prepared above was covered with methanol to form a slurry after which 120 gms. of methyl iodide was added. The mixture was heated for 6 hours at 35° C. After the resulting product was washed with water and dried, it was found to have a basicity value of 10.5 kgr./cu. ft., an ultimate capacity of 20.0 kgr./cu. ft. and a density of 140 gms./liter.

About 84 gms. of the above quaternary ammonium derivative was suspended in 150 ml. of water and 150 gms. of a 70% solution of dimethylethanolamine was added. The mixture was heated, with stirring, for 10 hours at 70% C. The resulting product after being washed and dried was found to have a basicity value of 13.0 kgr./cu. ft., an ultimate capacity of 20.0 kgr./cu. ft. and a density of 187 gms./liter.

*Example 4*

About 60 gms. of a 5% crosslinked copolymer, as prepared in Example 1, was suspended in methanol and 106 gms. of methyl iodide was added after which the mixture was heated, with stirring, at 30° C. for 12 hours.

About 94 gms. of the above quaternized derivative was suspended in a mixture of 40 ml. of acetic anhydride, 120 gms. of sodium acetate and 500 ml. of glacial acetic acid. The suspension was heated to 80° C. and 35 gms. of chlorine gas was bubbled into the suspension while the suspension was irradiated with ultra-violet light. The resulting chlorinated product was filtered, washed with water and dilute sodium hydroxide, rewashed with water and dried. The resulting product was found to contain 16% chlorine.

About 75 gms. of the above chlorinated-quaternized material was suspended in 100 ml. of water and 100 gms. of a 70% dimethylethanolamine solution was added. The mixture was heated at 50° C. for 8 hours and then washed and dried. The resulting material had a basicity value of 11.0 kgr./cu. ft., an ultimate capacity of 15.1 kgr./cu. ft. and a density of 256 gms./liter.

*Example 5*

About 75 gms. of the chlorinated-quaternized product produced in Example 4 was suspended in 50 ml. of water and 150 gms. of a 25% solution of trimethylamine was added. The suspension was heated at 50° C. for 10 hours, then washed and dried. The resulting tertiary amine-quaternary ammonium derivative had a basicity value of 9.2 kgr./cu. ft., an ultimate capacity of 14.9 kgr./cu. ft. and a density of 200 gms./liter.

*Example 6*

About 100 gms. of a 5% crosslinked copolymer, as prepared in Example 1, was suspended in 80 ml. of acetic anhydride, 240 gms. of sodium acetate and 1000 ml. of glacial acetic acid. The resulting suspension was heated to 80° C. and 62 gms. of chlorine gas was passed into the suspension, with stirring, while exposed to ultra-violet light. After 4 hours, the material was filtered, washed with water, then dilute sodium hydroxide, rewashed with water and dried. The resulting product had a chlorine content of 28.3%.

About 100 gms. of the wet chlorinated copolymer beads was suspended in 75 ml. of water and 175 gms. of a 70% solution of dimethylethanolamine was added. The mixture was heated to 70° C. and stirred for 10 hours. After being washed and dried, the resulting product had a basicity value of 8.1 kgr./cu. ft. and an ultimate capacity of 17.1 kgr./cu. ft.

About 90 gms. of the above tertiary-quarternary alkanolamine derivative was covered with methanol to form a slurry and 110 gms. of methyl iodide added. The mixture was heated to 35° C. for 8 hours, after which the resulting product was washed and dried. This product had a basicity value of 15.5 kgr./cu. ft., an ultimate capacity of 21.3 kgr./cu. ft. and a density of 204 gms./liter.

*Example 7*

A copolymer containing 10% crosslinker was prepared in the following manner: To about 1800 ml. of water heated to 55° C. was added a mixture of 490 gms. of 2-methyl-5-vinyl pyridine, 110 gms. of 54.8% strength divinyl benzene, 46.2% strength ethyl vinyl benzene, and 3.6 gms. of benzoyl peroxide. The mixture was stirred and heated at a temperature of 80° C. for 4 hours. A quantitative yield of copolymer was obtained which was then washed and dried at 130° C. for 3 hours.

About 100 gms. of the above copolymer was suspended in 80 ml. of acetic anhydride, 240 gms. of sodium acetate and 1000 ml. of glacial acetic acid. About 65 gms. of chlorine gas was passed into the suspension over a period of about 4 hours during which the suspension was irradiated with ultraviolet light and heated to 80° C. After being washed with water and dilute sodium hydroxide, rewashed with water and dried, the product had a chlorine content of 18.5%.

About 100 gms. of the wet chlorinated material prepared above was suspended in 190 ml. of water and 190 gms. of a 70% solution of dimethylethanolamine and the mixture heated to 70° C. and stirred for 6 hours. After being washed and dried, the material had a basicity value of 12.8 kgr./cu. ft. and an ultimate capacity of 35.0 kgr./cu. ft.

About 82 gms. of the tertiary-quaternary amine derivative prepared above was suspended in methanol to form a slurry and 108 gms. of methyl iodide was added. The mixture was heated, with stirring, at 35° C. for 10 hours. The resulting beads were then washed with alcohol and water and then dried. The resulting quaternary ammonium derivative of the copolymer was found to have a basicity value of 24.1 kgr./cu. ft., an ultimate capacity of 32.5 kgr./cu. ft. and a density of 428 gms./liter.

*Example 8*

A copolymer containing 9% crosslinker was prepared in the following manner: To about 1800 ml. of water heated to 65° C. was added a mixture of 501 gms. of 2-methyl-5-vinyl pyridine, 99 gms. of 54.8% strength divinyl benzene - 46.2% strength ethyl vinyl benzene, and 3.6 gms. of benzoyl peroxide. The mixture was stirred and heated at a temperature of 80° C. for 5 hours. A quantitative yield of copolymer was obtained which was then washed and dried at 100° C. for 6 hours.

About 150 gms. of the above material was suspended in 300 ml. of water and 10 gms. of calcium oxide was added. The mixture was treated with methyl chloride for several hours under pressure, and then acidified, filtered and the resin washed with water. The product was then air-dried and had a basicity value of 11.8 kgr./cu. ft.

About 130 gms. of the quaternized pyridine derivative was suspended in 76 ml. of acetic anhydride, 310 gms. of sodium acetate and 1300 ml. of glacial acetic acid. About 150 gms. of chlorine gas was passed into the suspension over a period of 5 hours during which the suspension was irradiated with ultra-violet light. After being washed with water and dilute sodium hydroxide, re-washed with water and dried, the product had a chlorine content of 19.8% and a basicity of 10.2 kgr./cu. ft.

About 200 gms. of the wet chlorinated product was suspended in 200 ml. of water and 260 gms. of a 70% solution of dimethylethanolamine was added and the mixture heated to 70° C., with stirring, for 6 hours. After being washed and dried, the material had a basicity value of 16.8 kgr./cu. ft., an ultimate capacity of 27.5 kgr./cu. ft. and a density of 299 gms./liter.

As has been stated earlier in this specification, reactants other than those utilized in the specific examples above may be used and in which case, other quaternary ammonium derivatives of the copolymers may be prepared in accordance with the scope of the invention. Thus, other crosslinkers, vinyl-alkyl pyridine compounds, tertiary amines and quaternizing agents may be used.

It is desirable that for use as anion exchange resins, the quaternary ammonium derivatives of the copolymers of the invention be converted to the corresponding quaternary ammonium hydroxide derivatives. This result is accomplished by passing a dilute aqueous solution of an alkali, such as sodium hydrixode, over the quaternary ammonium derivative of the copolymer.

As used in the examples and elsewhere in this specification, the term "basicity value" (sometimes referred to as "salt-splitting capacity") is a measure of the capacity of the anion exchange resin to remove the anions of weak acids. Since the value of a highly basic anion exchange resin may often reside in its ability to remove the anions of weak acids, as well as those of strong acids, this is a critical value of the performance of any basic anion exchange resin. As expressed here, this value is obtained by passing 270 ml. of a 0.75 normal sodium hydroxide solution through a 16 mm. column containing 40 ml. of the anion exchange resin at a flow rate of approximately 5 ml. per minute. This places the anion exchange resin or polymerizate in the hydroxide exchanging condition. The resin bed is rinsed as free as possible of phenolphthalein alkalinity with distilled water. 750 ml. of 0.5 normal sodium chloride solution is next passed through the resin bed at a flow rate of 7.5 ml. per minute. The column is washed with distilled water. The effluent and washings from the sodium chloride treatment are collected, mixed and titrated with 0.02 normal sulfuric acid solution to a methyl orange endpoint. Since the strongly basic anion exchange resin will remove chloride ion from the sodium chloride solution and convert sodium chloride to sodium hydroxide, this determination permits the calculation of the sodium chloride converted to sodium hydroxide giving the "basicity value" capacity of the anion exchange resin. This sodium chloride splitting value is expressed in kilograins of calcium carbonate per cubic foot of anion exchange resin. Resins having a high "basicity value" will have a high capacity for the removal of weak acids, such as silicic acid and carbonic acid from solutions.

The term "ultimate capacity" used in the examples and elsewhere in the specification is determined by placing 40 ml. of resin, which has first been placed in the chloride form by passing an excess solution of dilute hydrochloric acid over the resin followed by washing with water, in a column of 16 mm. size and through this column is passed 1000 ml. of 0.75 normal sodium hydroxide at the rate of 5 ml./min. The resin bed is then washed free of phenolphthalein alkalinity with distilled water. Next 800 ml. of 0.25 normal hydrochloricsulfuric acid solution (a ratio of 1.5 parts of hydrochloric to 2.5 parts of sulfuric) is passed through the resin bed at a flow rate of 10 ml./min. Next 700 ml. of distilled water is passed through the tube. The effluent is collected and mixed and an aliquot is titrated to determine the residual acid. From this, the total amount of acid absorbed may be computed in terms of kgr./cu. ft. of calcium carbonate which gives the total or ultimate capacity of the resin.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. A highly basic anion exchange resin comprising a copolymer of about 60% to 99.9% on a molar basis of a vinyl methyl pyridine and about 40% to 0.1% on a molar basis of a crosslinking compound selected from the class consisting of polymerizable polyvinyl aromatic and polyvinyl aliphatic compounds; said copolymer having quaternary ammonium groups substituted on the methyl groups on the pyridine nuclei and having the ring nitrogen atoms of the pyridine quaternized; the quaternizing substituent groups of each of the quaternary ammonium groups being a member selected from the class consisting of alkyl, aralkyl and alkanol groups.

2. A highly basic anion exchange resin comprising a copolymer of about 60% to 99.9% on a molar basis of a vinyl methyl pyridine and about 40% to 0.1% on a molar basis of a crosslinking compound selected from the class consisting of polymerizable polyvinyl aromatic and polyvinyl aliphatic compounds; said vinyl methyl pyridine moiety having the methyl group in a position alpha to the nitrogen of the pyridine ring; said copolymer having quaternary ammonium groups substituted on the methyl groups on the pyridine nuclei and having the ring nitrogen atoms of the pyridine quaternized; the quaternizing substituent groups of each of the quaternary ammonium groups being a member selected from the class consisting of alkyl, aralkyl and alkanol groups.

3. A highly basic anion exchange resin as defined by claim 2, wherein the vinyl methyl pyridine is 5-vinyl-2-methyl pyridine.

4. A highly basic anion exchange resin as defined in claim 2, wherein the crosslinking compound is divinyl benzene.

5. A highly basic anion exchange resin as defined by claim 2, wherein the crosslinking compound is divinyl ketone.

6. A highly basic anion exchange resin as defined by claim 2, wherein the crosslinking compound is a vinyl ester of acrylic, methacrylic and ethacrylic acids.

7. A highly basic anion exchange resin as defined by claim 2, wherein the crosslinking compound is a divinyl ester of a dibasic acid.

8. A highly basic anion exchange resin as defined by claim 2, wherein the crosslinking compound is an acrylic diester of an aliphatic polyhydric alcohol.

9. A highly basic anion exchange resin comprising a copolymer of about 85% to 95% by weight of 5-vinyl-2-methyl pyridine and about 15% to 5% by weight of divinyl benzene; said copolymer having quaternary ammonium groups substituted on the methyl groups on the pyridine nuclei and having the ring nitrogen atoms of the pyridine quaternized; the quaternizing substituent groups of each of the quaternary ammonium groups being a member selected from the class consisting of alkyl, aralkyl and alkanol groups.

10. A highly basic anion exchange resin comprising a copolymer of about 90% by weight of 5-vinyl-2-methyl pyridine and about 10% by weight of divinyl benzene; said copolymer having dimethylethanol ammonium halide groups substituted on the methyl groups on the pyridine nuclei and having the ring nitrogen atoms of the pyridine quaternized with an alkyl halide.

11. A process for preparing a highly basic anion exchange resin comprising a copolymer of about 60% to 99.9% on a molar basis of a vinyl methyl pyridine and about 40.0% to 0.1% on a molar basis of a crosslinking compound selected from the class consisting of polymerizable polyvinyl aromatic and polyvinyl aliphatic compounds; said copolymer having quaternary ammonium groups substituted on the methyl groups on the pyridine nuclei and having the ring nitrogen atoms of the pyridine quaternized; the quaternizing substituent groups of each of the quaternary ammonium groups being a member selected from the class consisting of alkyl, aralkyl and alkanol groups, which process comprises halogenating said copolymer, treating the resulting halogenated copolymer with a tertiary amine then with a quaternizing agent; the substituent groups of said tertiary amine and said quaternizing agent being selected from the class consisting of alkyl, aralkyl and alkanol groups; the halogen of said halogenated copolymer being a member selected from the class consisting of chlorine and bromine.

12. A process for producing a highly basic anion exchange resin comprising a copolymer of about 60% to 99.9% on a molar basis of 5-vinyl-2-methyl pyridine and about 40.0% to 0.1% on a molar basis of divinyl benzene; said copolymer having quaternary ammonium groups substituted on the methyl groups on the pyridine nuclei and having the ring nitrogen atoms of the pyridine quaternized; the quaternizing substituent groups of each of the quaternary ammonium groups being a member selected from the class consisting of alkyl, aralkyl and alkanol groups, which process comprises chlorinating said copolymer with gaseous chlorine, treating the resulting chloromethylated copolymer with a tertiary amine, then with an alkyl halide; the substituent groups of said tertiary amine being selected from the class consisting of alkyl, aralkyl and alkanol groups.

13. A process for producing a highly basic anion exchange resin comprising a copolymer of about 60% to 99.9% on a molar basis of a vinyl methyl pyridine and about 40.0% to 0.1% on a molar basis of a crosslinking compound selected from the class consisting of polymerizable polyvinyl aromatic and polyvinyl aliphatic compounds; having quaternary ammonium groups substituted on the methyl groups on the pyridine nuclei and having the ring nitrogen atoms of the pyridine quaternized; the quaternizing substituent groups of each of the quaternary ammonium groups being a member selected from the class consisting of alkyl, aralkyl and alkanol groups, which process comprises treating said copolymer with a quaternizing agent, halogenating the quaternized product, followed by treatment with a tertiary amine; the substituent groups of said tertiary amine and said quaternizing agent being selected from the class consisting of alkyl, aralkyl and alkanol groups; the halogen of said halogenated copolymer being a member selected from the class consisting of chlorine and bromine.

14. The process of removing anions from an aqueous solution which comprises contacting such solution with a highly basic anion exchange resin as defined in claim 1.

15. The process of removing anions from an aqueous solution which comprises contacting such solution with a highly basic anion exchange resin as defined in claim 2.

References Cited in the file of this patent

UNITED STATES PATENTS

| | | |
|---|---|---|
| 2,540,984 | Jackson | Feb. 6, 1951 |
| 2,540,985 | Jackson | Feb. 6, 1951 |
| 2,632,001 | McMaster et al. | Mar. 17, 1953 |
| 2,680,732 | Martin | June 8, 1954 |

OTHER REFERENCES

Fieser et al.: Organic Chemistry, 2nd edition, page 847, published by Heath and Co., Boston (1950).